United States Patent
Ing et al.

(10) Patent No.: US 10,199,626 B2
(45) Date of Patent: Feb. 5, 2019

(54) SPRING LOADED BUSBAR FOR LASER WELDING OPERATION

(71) Applicant: NIO USA, Inc., San Jose, CA (US)

(72) Inventors: Adam H. Ing, Santa Clara, CA (US); Alexander J. Smith, White Lake, MI (US); Austin L. Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 17 days.

(21) Appl. No.: 15/581,126

(22) Filed: Apr. 28, 2017

(65) Prior Publication Data

US 2018/0315974 A1     Nov. 1, 2018

(51) Int. Cl.
  *B23K 26/02*  (2014.01)
  *H01M 2/20*  (2006.01)
  *H01M 2/34*  (2006.01)
  *B23K 11/11*  (2006.01)

(52) U.S. Cl.
  CPC ............ *H01M 2/206* (2013.01); *B23K 11/11* (2013.01); *B23K 26/02* (2013.01); *H01M 2/348* (2013.01); *H01M 2200/103* (2013.01)

(58) Field of Classification Search
  CPC ................ H01M 2/206; H01M 2/348; H01M 2200/103; B23K 11/11; B23K 26/02
  See application file for complete search history.

(56) References Cited

U.S. PATENT DOCUMENTS

| | | | |
|---|---|---|---|
| 4,842,534 A | 6/1989 | Mobley et al. | |
| 5,162,164 A | 11/1992 | Dougherty et al. | |
| 5,853,305 A | 12/1998 | Bedrossian et al. | |
| 6,178,106 B1 | 1/2001 | Umemoto et al. | |
| 8,409,744 B2 | 4/2013 | Ljaz et al. | |
| 2011/0318972 A1 | 12/2011 | Koellmann | |
| 2012/0305283 A1 | 12/2012 | Kalayjian et al. | |
| 2013/0130070 A1 | 5/2013 | Adachi et al. | |
| 2014/0315051 A1* | 10/2014 | Han | H01M 2/202 429/61 |
| 2015/0086834 A1* | 3/2015 | Cho | H01M 2/206 429/121 |
| 2015/0263326 A1 | 9/2015 | Gunther et al. | |
| 2015/0295219 A1* | 10/2015 | Kamiya | H01M 2/30 429/158 |
| 2015/0349317 A1* | 12/2015 | Byun | H01M 2/06 429/179 |
| 2016/0248073 A1* | 8/2016 | Jang | H01M 2/30 |

FOREIGN PATENT DOCUMENTS

JP     2007/144436     6/2007

* cited by examiner

*Primary Examiner* — Stewart A Fraser
(74) *Attorney, Agent, or Firm* — Sheridan Ross P.C.

(57) ABSTRACT

A spring-loaded busbar has a first portion divided from a second portion by a first pair of notches and a third portion divided from the second portion by a second pair of notches. The second portion is bent relative to the first portion and the third portion is bent relative to the second portion. The busbar is configured to deform elastically when pressed against an electrical cell to ensure proper contact between the busbar and the cell before the busbar is welded to the cell.

20 Claims, 9 Drawing Sheets

SPRING LOADED BUSBAR FOR LASER WELDING OPERATION

FIELD

The present disclosure is generally directed to battery module construction, and more particularly to busbar electrical connections.

BACKGROUND

Advances in battery technology have resulted in the increasing use of large batteries, comprising tens, hundreds, or even thousands of individual cells, for applications such as powering various electrical components of vehicles (including vehicles designed for travel over land and water and through the air) and storing electricity generated using renewable energy sources (e.g. solar panels, wind turbines). A busbar is used to collect electricity generated by each cell (when the battery is in a discharge state) and route the collected electricity to the battery terminal. The busbar also routes electricity provided via the battery terminal (when the battery is in a recharge state) to the individual terminals of each cell within the battery. For the battery to operate safely and efficiently, the connection between the busbar and the terminal of each cell must be sufficiently secure to remain intact despite any forces resulting from vibration, expansion due to changing temperature, or other conditions to which the battery might be subjected. If a connection between the busbar and the terminal of a cell fails, then the cell will no longer contribute to the proper functioning of the battery. Additionally, if any short circuits are caused by such failure, then the battery could catch fire or otherwise be rendered inoperable and/or unsafe.

DETAILED DESCRIPTION

Figure 1B:
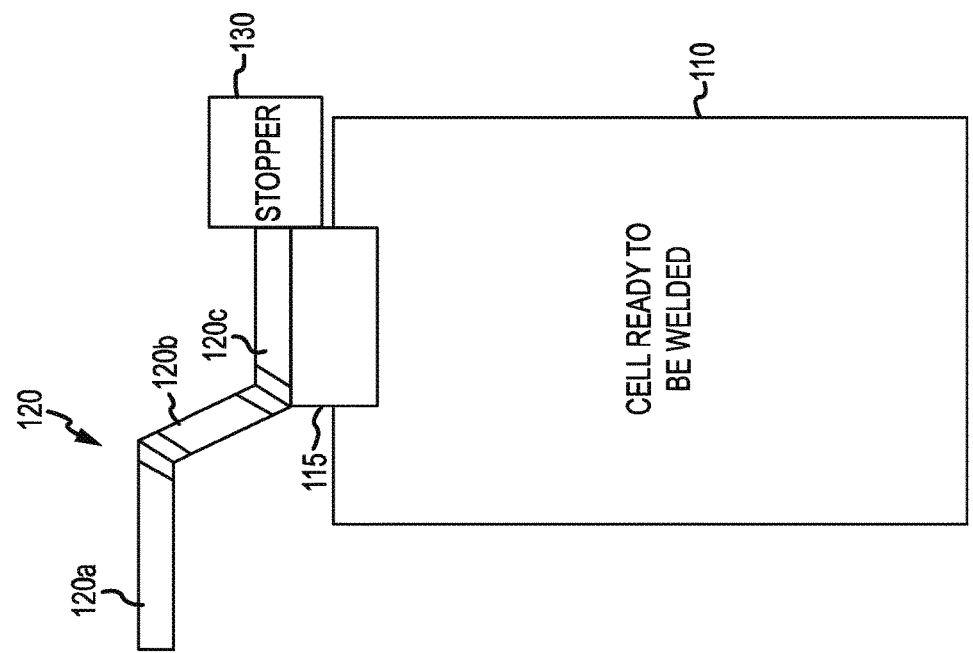
FIG. 1B shows the busbar of FIG. 1A in contact with the electrical cell of FIG. 1A and ready to be welded thereto.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Laser welding is commonly used to secure a busbar to terminals of individual cells in a battery. One of the biggest challenges for laser welding electrical connections is ensuring planar contact between weld surfaces, so as to achieve a high-quality weld. The need for ensuring planar contact between weld surfaces causes great difficulty when designing for tolerances and avoiding mechanical fixtures for each weld.

Figure 1A:
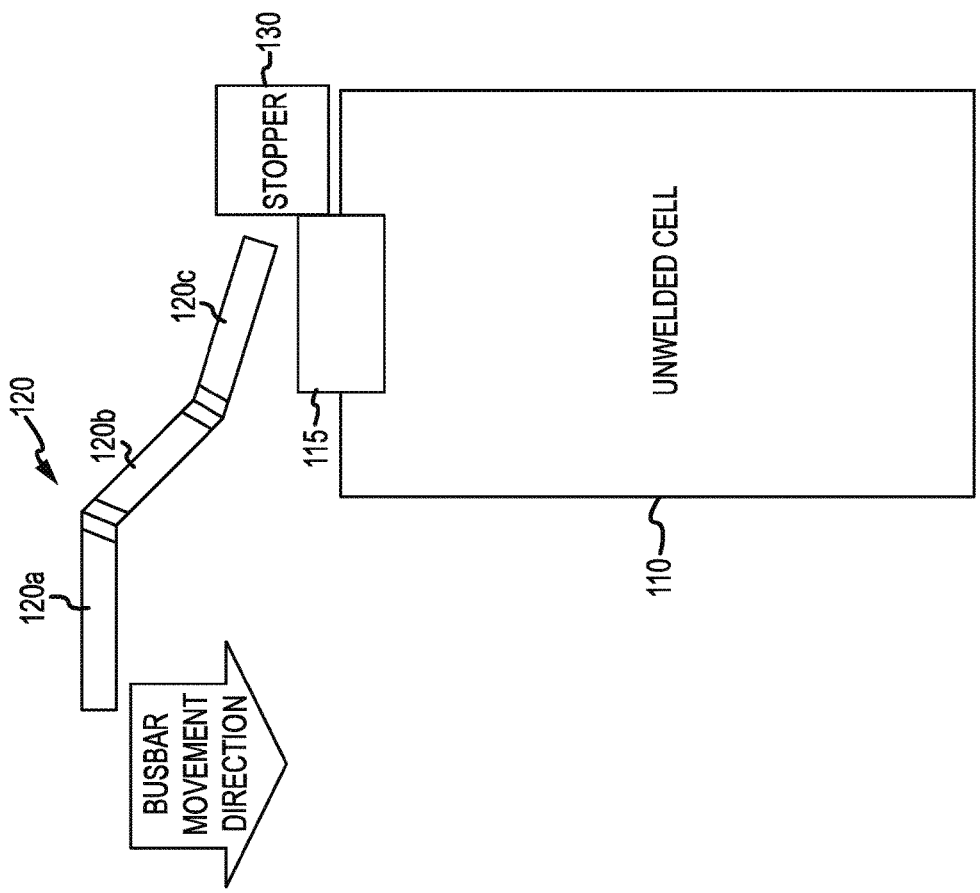
FIG. 1A shows a busbar prior to contact with an electrical cell according to one embodiment of the present disclosure.

FIG. 1A depicts a spring loaded busbar 120 according to one embodiment of the present disclosure. Also shown in FIG. 1A is an electrical cell 110 having a terminal 115, to which the busbar 120 is to be welded or otherwise attached.

The spring loaded busbar 120, which is made out of metal or another material with suitable electrical conductivity and suitable elasticity, comprises three tabs or portions: an extension tab or portion 120a, a connector tab or portion 120b, and a contact tab or portion 120c. The three tabs 120a, 120b, and 120c are formed from a single piece of material, but adjacent tabs 120a, 120b and 120b, 120c are configured to bend with respect to one another. In an original configuration of the busbar 120, the tab 120a is substantially horizontal, while the tab 120b has been bent beyond the elastic limit of the material from which the busbar 120 is manufactured so as to have a downward angle relative to the tab 120a with a first slope. The tab 120c has also been bent beyond the elastic limit of the busbar 120 so as to have a downward angle relative to the tab 120a, albeit with a second slope that is not as steep as the first slope. Stated differently, the angle between the tabs 120a and 120b has an absolute value that is greater than the absolute value of the angle between the tabs 120b and 120c. In the depicted configuration of the busbar 120, an imaginary line drawn through and perpendicular to the extension tab 120a does not pass through any portion of the contact tab 120c.

This configuration of the busbar 120 preloads the busbar 120 so that when the tab 120c is forced into a horizontal configuration (as discussed below) substantially parallel with the tab 120a (e.g., at an angle of zero degrees relative to the tab 120a), the elasticity of the busbar 120 will cause the busbar 120 to attempt to spring back to its original configuration in which the tab 120c had a downward slope. As a result, the tab 120c will press down on the terminal 115, thus improving the contact between the tab 120c and the terminal 115.

The welding operation begins with the relative movement of the busbar 120 and the cell 110 toward each other, with the tab 120c positioned substantially above the terminal 115.

This may be accomplished by moving the cell 110 toward the stationary busbar 120, by moving the busbar 120 toward the stationary cell 110, or by moving both the busbar 120 and the stationary cell 110 toward each other. Before, at, or soon after the moment of contact between the busbar 120 and the terminal 115, a stopper 130 is provided adjacent the terminal 115. The stopper 130, which may in some embodiments be made out of plastic, may be permanently or detachably affixed to the cell 110. Alternatively, the stopper 130 may be affixed to a machine that moves the stopper 130 into place while also moving the busbar 120 and the cell 110 closer to each other. In still other embodiments, the stopper 130 may be manually placed adjacent the terminal 115 of the cell 110 before the busbar 120 is welded to the terminal 115. Notably, the stopper 130 is located adjacent the terminal 115 so as to ensure that the busbar 120—and more particularly the contact tab 120c of the busbar 120—remains over the terminal 115 rather than sliding beyond the terminal 115.

Referring now to FIGS. 1A and 1B, as the contact tab 120c of the busbar 120 contacts the terminal 115 of the cell 110, the force exerted on the tab 120c by the terminal 115 causes the tab 120c to simultaneously bend upward (so that the slope of the tab 120c approaches zero) and slide towards the stopper 130. Eventually the contact tab 120c will contact the stopper 130, and the upward force exerted by the terminal 115 together with the sideways force exerted by the stopper 130 will cause the tab 120c to bend relative to the connector tab 120b, until the tab 120c has achieved substantially planar contact with the terminal 115. Additionally, as a result of the forces acting on the contact tab 120c, the contact tab 120c may exert a moment on the connector tab 120b that causes the slope of the connector tab 120b to increase (i.e., to become steeper). At the same time, the elasticity of the busbar 120 will cause the busbar 120 to attempt to return to its original configuration, which in turn will cause the tab 120c to exert a downward force on the terminal 115, thus improving the contact between the tab 120c and the terminal 115.

Once the contact tab 120c achieves substantially planar contact with the terminal 115, the contact tab 120c can be welded to the terminal 115. The contact tab 120c may be laser welded to the terminal 115 or spot welded to the terminal 115. In some embodiments, the contact tab 120c may be affixed to the terminal 115 using means other than welding, including by the application of adhesive or the use of one or more mechanical fasteners.

Figure 2:
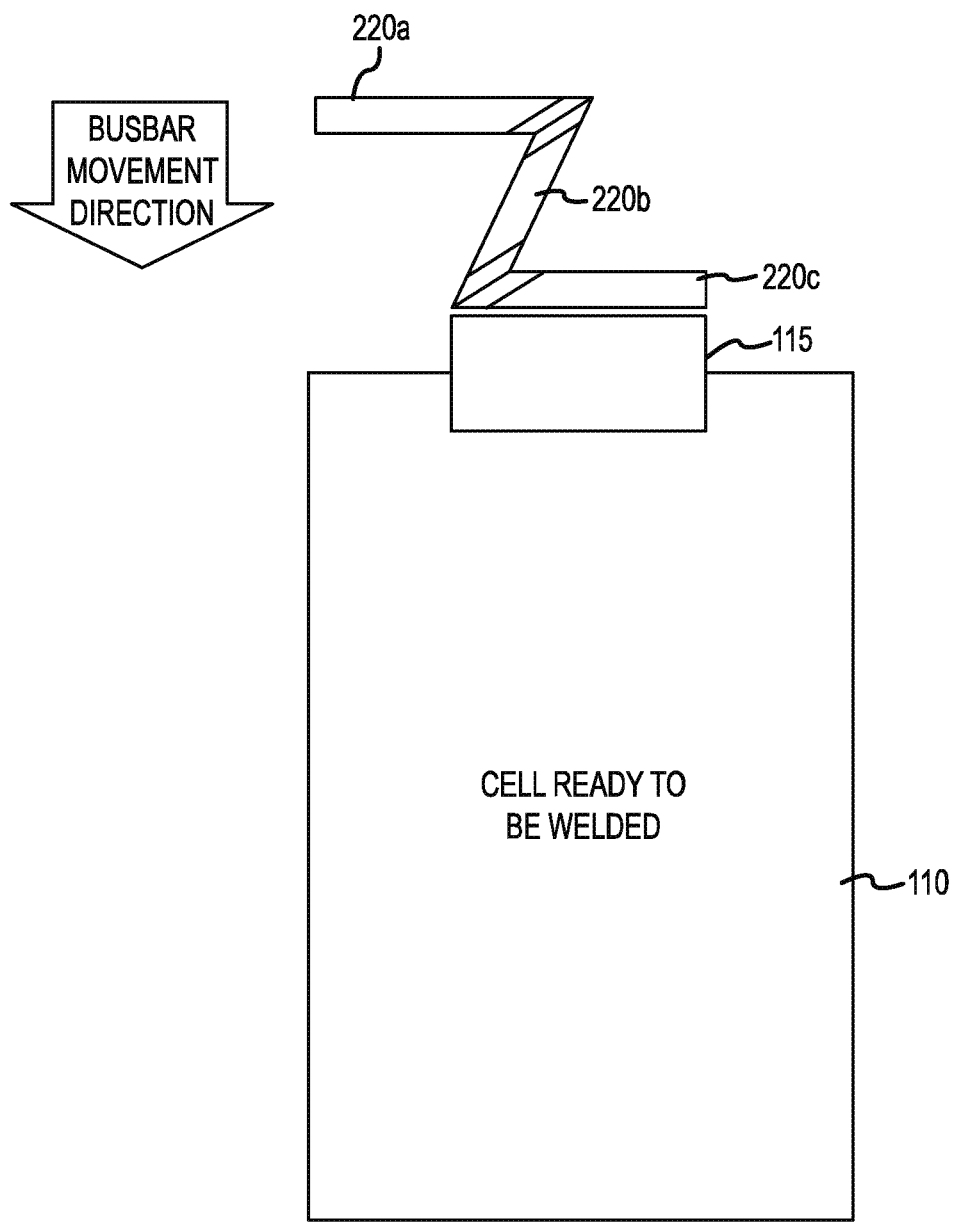
FIG. 2 shows a busbar according to another embodiment of the present disclosure in contact with an electrical cell and ready to be welded thereto.

Turning now to FIG. 2, a busbar 220 comprising an extension tab 220a, a connector tab 220b, and a contact tab 220c is substantially similar to the busbar 120, but is provided with a different original configuration. In the original configuration of the busbar 220, the connector tab 220b is bent downwardly with respect to the substantially horizontal tab 220a until it has passed beyond vertical, so as to form an acute angle between the underside of the tab 220a and the original underside (now the topside) of the tab 220b. The tab 220b thus extends underneath a portion of the tab 220a. The tab 220c, like the tab 220a, is substantially horizontal (i.e., substantially parallel to the tab 220a, or with an angle of zero degrees relative to the tab 220a), such that the topside of the tab 220c forms an acute angle with the original topside (now the underside) of the tab 220b. The tab 220c thus extends underneath the tab 220a as well as underneath a portion of the tab 220a (the same portion under which the tab 220b extends). An imaginary line drawn through the tab 220a, in a direction that is perpendicular to the tab 220a, would pass through the tab 220c depending on where along the length of the tab 22a the line were drawn.

This "z"-shaped configuration is achieved by bending the busbar 220 beyond its elastic limit, such that the busbar 220 is preloaded and will attempt to spring back into this configuration when it is further deformed within its elastic limit. Although no stopper such as the stopper 130 is shown in FIG. 2, a stopper such as the stopper 130 may be used in connection with a busbar 220 in some embodiments.

The welding operation involving the busbar 220 begins with the relative movement of the busbar 220 and the cell 110 toward each other, with the tab 220c positioned directly above the terminal 115. As with the embodiment of FIGS. 1A-1B, this may be accomplished by moving the cell 110 toward the stationary busbar 220, by moving the busbar 220 toward the stationary cell 110, or by moving both the busbar 220 and the stationary cell 110 toward each other.

As the contact tab 220c of the busbar 220 contacts the terminal 115 of the cell 110, spring force of the busbar 220 pushes tab 220c against the terminal 115. In some embodiments, a stopper 130 may be positioned next to the terminal 115 to assist in maintaining proper alignment of the tab 220c over the terminal 115. The relative movement of the cell 110 and the busbar 220 stops after the busbar 220 has been pushed against the terminal 115 enough to cause the busbar 220 to bend farther (e.g., so that the angles between the tabs 220a, 220b and the tabs 220b, 220c are more acute than in the original configuration of the busbar 220), but before the busbar 220 has been deformed beyond its elastic limit. As a result of the elasticity of the busbar 220, the busbar 220 attempts to return to its original configuration, which results in a force that presses the tab 220c against the terminal 115, thus improving the contact between the busbar 220 and the terminal 115.

The busbars 120 and 220 may be sized according to the specific requirements of a given application, taking into consideration such factors as the voltage that will be applied across the busbars 120, 220; the current that will flow through the busbars 120, 220; and the temperatures to which the busbars 120, 220 will be exposed and at which the busbars 120, 220 will operate. Additionally, the busbars 120, 220 may be sized so as to achieve a desired spring constant.

Material selection for the busbars 120, 220 may depend on material properties such as the material's resistivity, conductivity, and yield strength.

Figure 3:
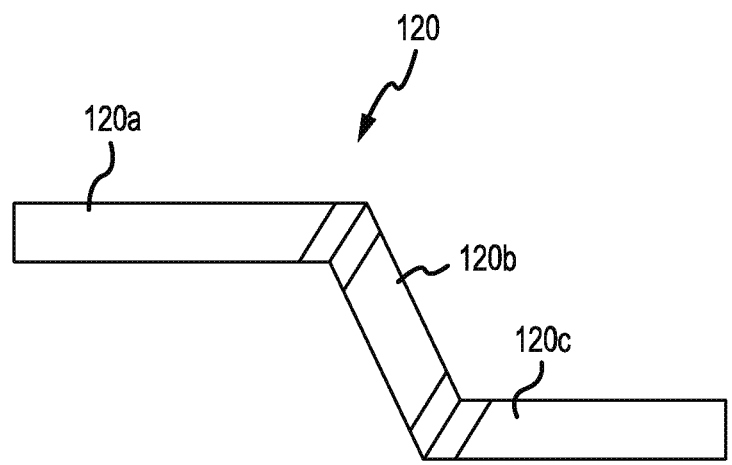
FIG. 3 shows a side elevation view of a busbar according to one embodiment of the present disclosure.

FIG. 3 provides a side view of the busbar 120 in its ready-to-be-welded configuration (corresponding to the position of the busbar 120 in FIG. 1B), with the tab 120c in a substantially horizontal position.

Figure 4:
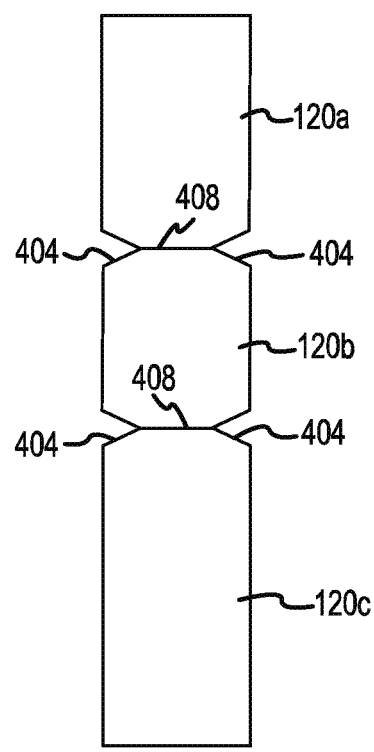
FIG. 4 shows a top plan view of a busbar according to the embodiment of FIG. 4.

FIG. 4 provides a top, or plan, view of the busbar 120 in its ready-to-be-welded configuration (corresponding to the position of the busbar 120 in FIG. 1B). As shown in this view, each of the tabs 120a, 120b, and 120c is longitudinally aligned between a first end 412 and a second end 416. Four notches 404 are visible. The four notches 404 are arranged in two pairs, with a first pair of notches 404 separating the extension tab 120a from the connector tab 120b, and a second pair of notches 404 separating the connector tab 120b from the contact tab 120c. The notches 404 serve at least two purposes. First, the notches 404 result in a line of weakness at the intersection between the adjacent tabs 120a, 120b and 120b, 120c, which line of weakness facilitates bending of the busbar 120 at those intersections. Second, each pair of the notches 404 creates a gate 408 having a reduced cross-sectional area relative to the remainder of the busbar 120. These gates 408 act as fuses in the busbar 120: the reduced cross-sectional area of the gates 408 causes the gates 408 to have a greater resistance than the remainder of the busbar 120, resulting in a higher temperature at the gates 408 than in the remainder of the busbar 120 for a given current. As the current traveling through the busbar 120 increases, the temperature of both the busbar 120 and the gates 408 will rise, but the temperature at the gates 408 will reach the melting point of the material from which the busbar 120 is made first. If and when that happens, the busbar 120 will melt at a gate 408, thus separating the busbar 120 into separate pieces. This, in turn, will electrically isolate the cell 110 that was connected to the busbar 120 in question, and the flow of current through the busbar 120 will stop.

The fuse characteristics of the gates 408 can be adjusted by varying the size of the notches 404 so as to vary the cross-sectional area of the gates 408. The smaller the cross-sectional area of the gates 408, the greater will be the resistance of the gates 408 and the greater will be the temperature differential between the gates 408 and the remainder of the busbar 120 for a given current. Conversely, the larger the cross-sectional area of the gates 408, the smaller will be the resistance of the gates 408 and the lesser will be the temperature differential between the gates 408 and the remainder of the busbar 120 for a given current.

In addition to sizing the notches 404 to result in a gate 408 having a desired cross-sectional area, the notches 404 must also be sized appropriately for the voltage(s) that will be applied across the busbar 120. If the voltage is too high and the width of the notch is too low, then undesirable arcing may occur. This can be prevented by ensuring that the width of the notches provides a sufficient gap between the adjacent tabs to prevent arcing for expected voltage levels.

The notches 404 may be wedge-shaped, as shown in FIG. 4. The notches 404 may also be arcuate, rectangular, square, etc., and/or combinations thereof.

Figure 5A:
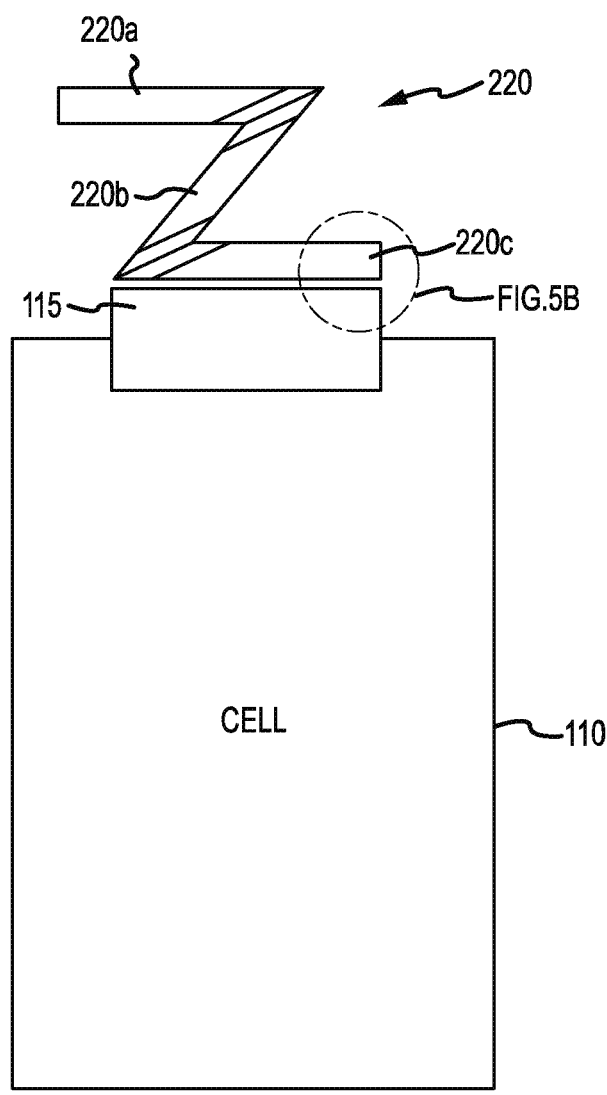
FIG. 5A shows a busbar according to another embodiment of the present disclosure in general contact with an electrical cell.
Figure 5B:
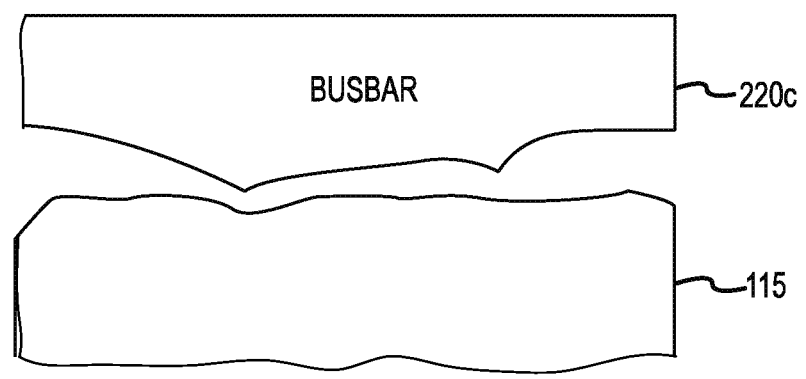
FIG. 5B shows an enlarged view of a contact area between the busbar and the electrical cell of FIG. 5A.

Referring now to FIGS. 5A and 5B, the use of a busbar 220 (or, alternatively, a busbar 120) to ensure planar contact with the terminal 115 of a cell 110 may still not provide a desired quality of contact between the busbar 220 and the terminal 115 depending on the existence, size and configuration of micro-deformities in the busbar 220 and/or the terminal 115. When laser welding is used to attach the busbar 220 to the terminal 115, the laser must be focused on a point of actual contact between the busbar 220 and the terminal 115. However, the presence of microdeformities may prevent the identification of an area of actual contact between the busbar 220 and the terminal 115.

Figure 6:
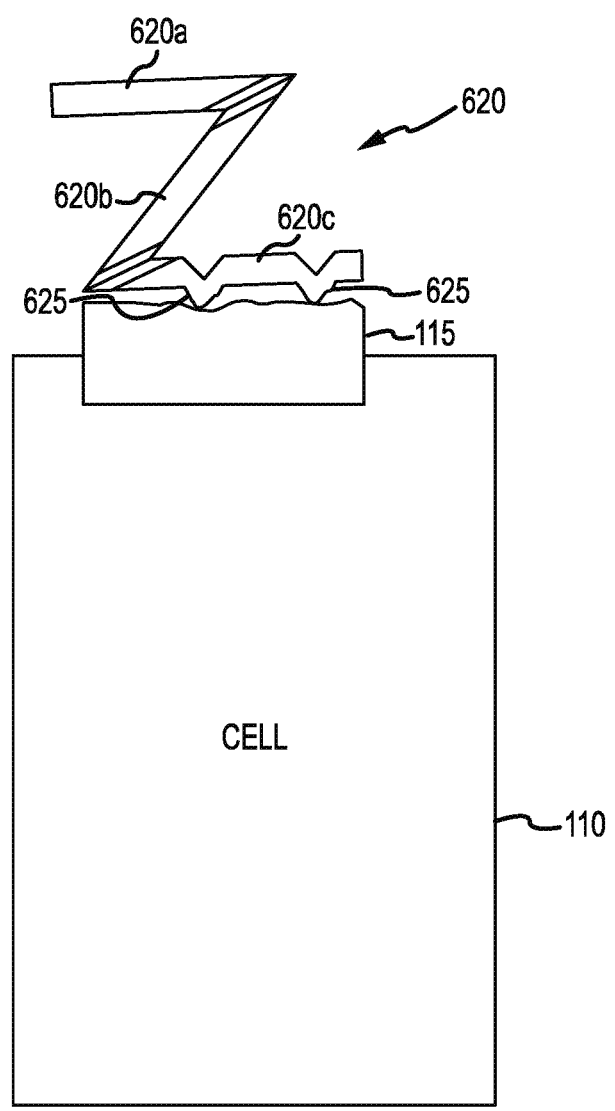
FIG. 6 shows a busbar according to yet another embodiment of the present disclosure in general contact with an electrical cell.
Figure 7A:
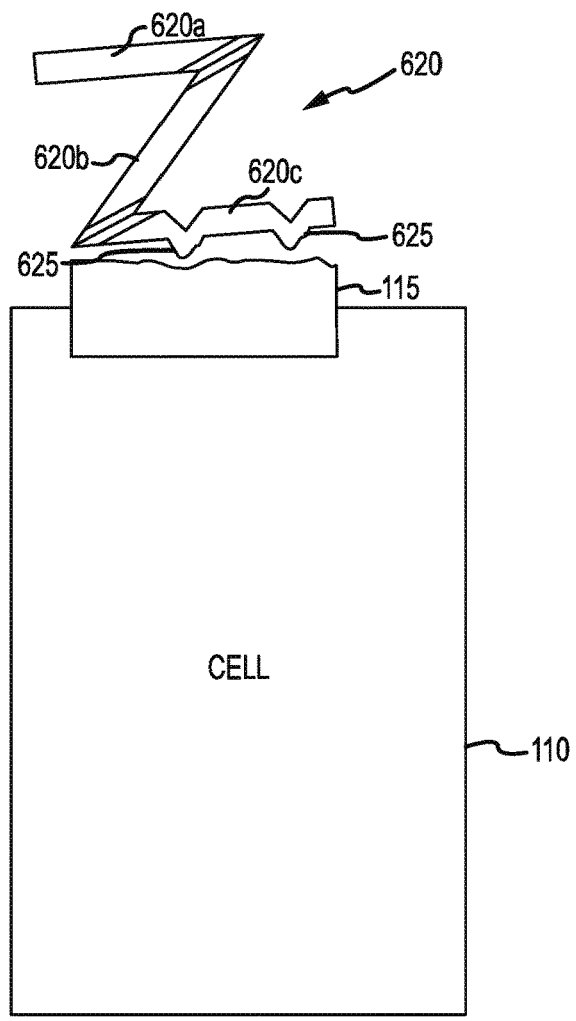
FIG. 7A shows a busbar according to the embodiment of FIG. 6 as it begins to make contact with the electrical cell of FIG. 6.
Figure 7B:
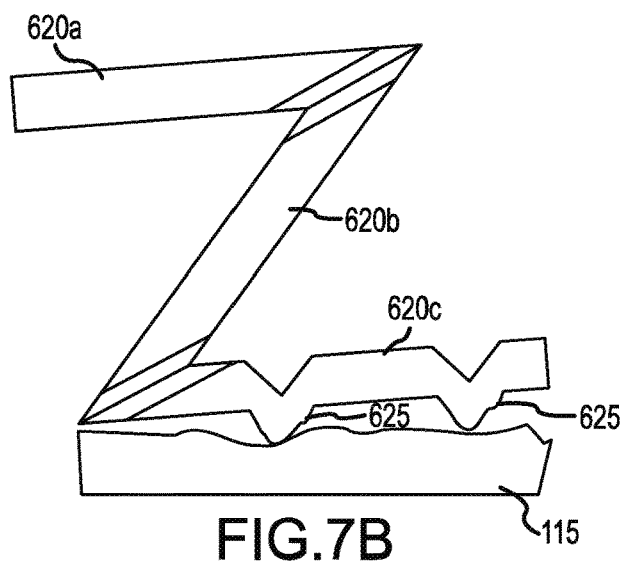
FIG. 7B shows an enlarged view of a contact area between the busbar and the electrical cell of FIG. 7A.

With reference now to FIGS. 6 and 7A-7B, to ensure that areas of actual contact are both identifiable and predictable, a busbar 620 (which is depicted as having the same "z" configuration as busbar 220, but may also be provided with the same configuration as the busbar 120) may comprise at least two protrusions or dimples 625 in a bottom surface of the contact tab 620c. Then, when the cell 110 and the busbar 620 are moved toward each other, the dimples 625 will contact the terminal 625 first, and will remain in contact with the terminal 625 as the tab 620c is pressed against the terminal 115. FIGS. 7A and 7B show the busbar 620 as it is being moved toward the cell 110, with one dimple 625 contacting the terminal 115 and the other approaching contact with the terminal 115. FIG. 6 shows the busbar 620 in a final position with respect to the cell 110, with both dimples 625 in contact with the terminal 115. Because the dimples 625 may be stamped in the same place on every busbar 620, the dimples 625 provide known locations of actual contact between the busbar 620 and the terminal 115. Consequently, the laser beam used for laser welding can be focused first on a dimple 625, thus improving the quality of the resulting weld.

Importantly, the size of the dimples 625 in FIGS. 6 and 7 has been exaggerated for illustrative purposes. The size of the dimples 625 may be significantly smaller than the height of the tab 620c of the busbar 620. For example, the dimples 625 may protrude only a fraction of a millimeter downwardly from the bottom surface of the contact tab 620c. The dimples 625 may be stamped into the busbar 620, although other manufacturing processes may also be used to create the dimples 625. Additionally, although FIGS. 6 and 7A-7B show a depression in an upper surface of the contact tab 620c above each dimple 625, the dimples may or may not coincide with such depressions.

Figure 8:
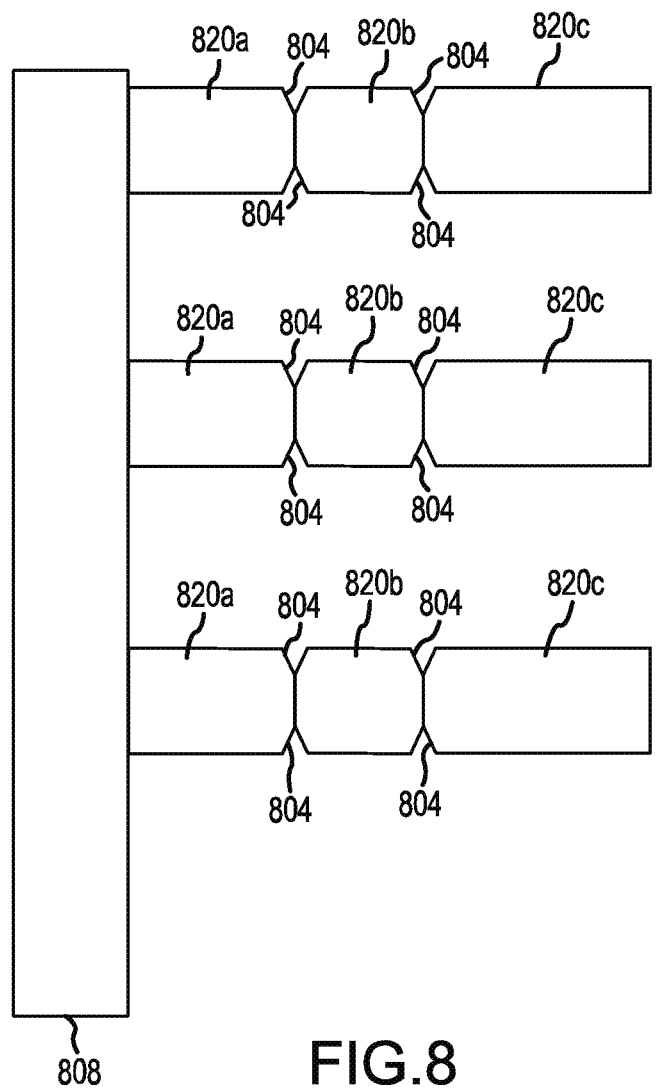
FIG. 8 shows a top plan view of a plurality of busbars extending from a bus strip according to a further embodiment of the present disclosure.
Figure 9:
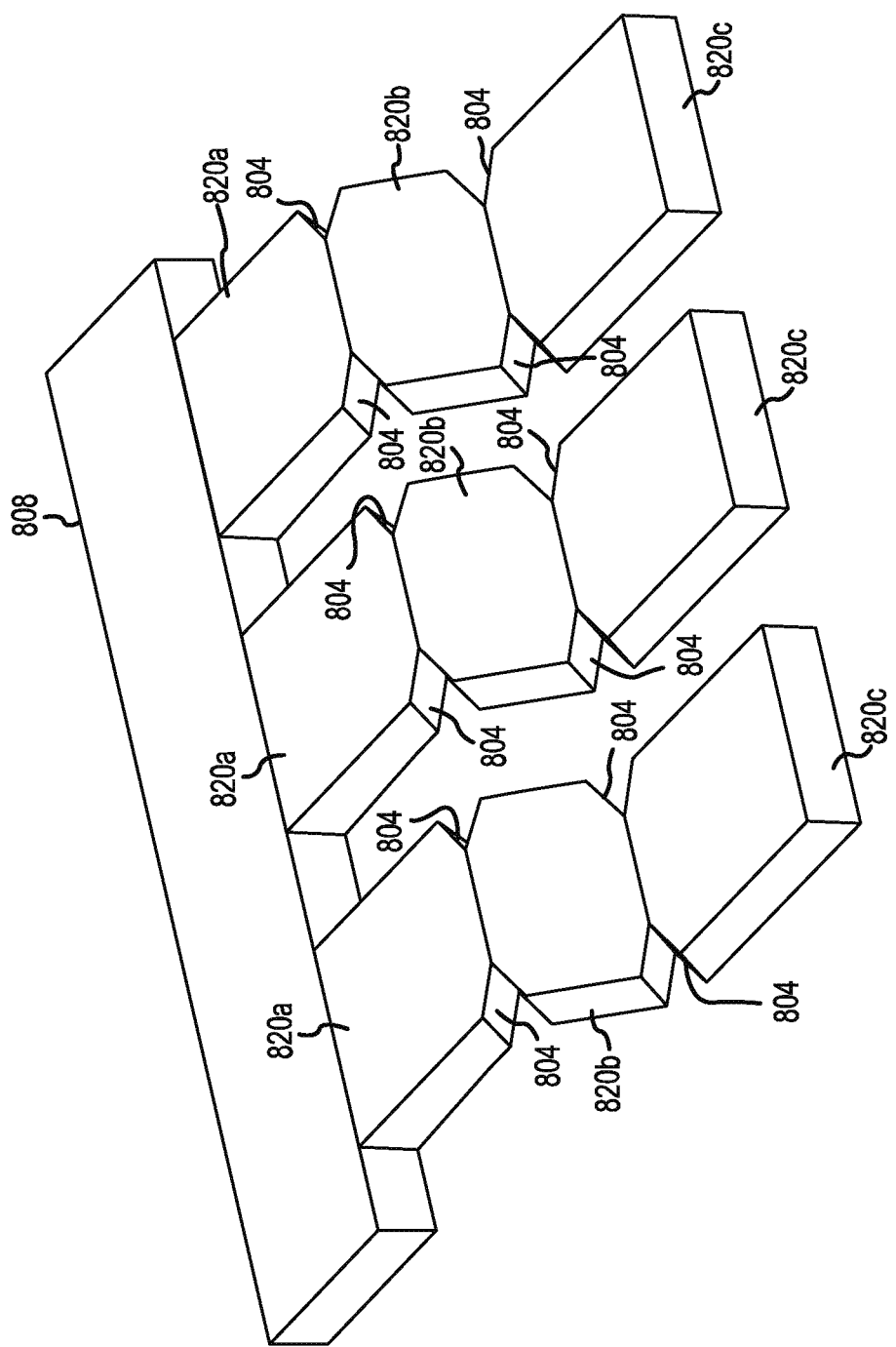
FIG. 9 shows a perspective view of the plurality of busbars extending from a bus strip according to the embodiment of FIG. 8.

Turning now to FIGS. 8 and 9, a plurality of busbars 820 (each of which may be the same as or similar to the busbars 120, 220, or 620) may extend from a single bus strip 808. The busbars 820 may be formed integrally with the bus strip 808 (i.e. out of a single piece of material), or the busbars 820 may be formed separately from the bus strip 808 and subsequently attached to the bus strip 808. Although FIGS. 8 and 9 depict three busbars 820 extending from bus strip 808, any number of busbars 820 may extend from a single bus strip 808. In some embodiments, the bus strip 808 may have the same width and height dimensions as the busbars 820.

The busbars 820, like the busbars 120, 220, and 620, comprise an extension tab 820a, a connector tab 820b, and a contact tab 820c. Notches 804 provided on either side of each busbar 820 at the intersection of adjacent tabs 820a, 820b and 820b, 820c serve the same purposes as the notches 404. The busbars 820 comprise a substantially planar top surface 812 running along the length thereof, and a substantially planar bottom surface running along the length thereof opposite the top surface 812. The extension tab 820a, the connector tab 820b, and the contact tab 820c are longitudinally aligned, such that a lateral side of any one of the tabs 820a, 820b, 820c shares a single plane with a lateral side of the other of the tabs 820a, 820b, 820c. The use of bus strips 808 having multiple busbars 820 extending therefrom advantageously reduces the number of operations that must be performed during manufacturing, because a row of cells 110 can moved into contact with a row of busbars 820 extending from a bus strip 808 in a single operation, instead of performing a separate operation to move each cell 110 into contact with each busbar 820 individually. Moreover, the use of busbars 820 facilitates the use of a single operation to move a row of cells 110 into contact with a row of busbars 820, by ensuring that minor variations in the orientation of each cell 110 do not prevent adequate contact between each cell 110 and a corresponding busbar 820.

In some embodiments of the present disclosure, a plurality of busbars 120, 220, 620, or 820 may be welded to a cell 110. For example, one busbar 120, 220, 620, or 820 may be welded to a positive terminal 115 on the cell 110, and another busbar 120, 220, 620, or 820 may be welded to a negative terminal 115 on the cell 110. Regardless of how many busbars 120, 220, 620, or 820 are welded to a particular cell 110 (or even to a particular terminal 115), each such busbar may be the same as or similar to the busbars 120, 220, 620, or 820, and the welding (or affixing via any other process) may occur in the same or a similar manner as any manner described herein.

Figure 10:
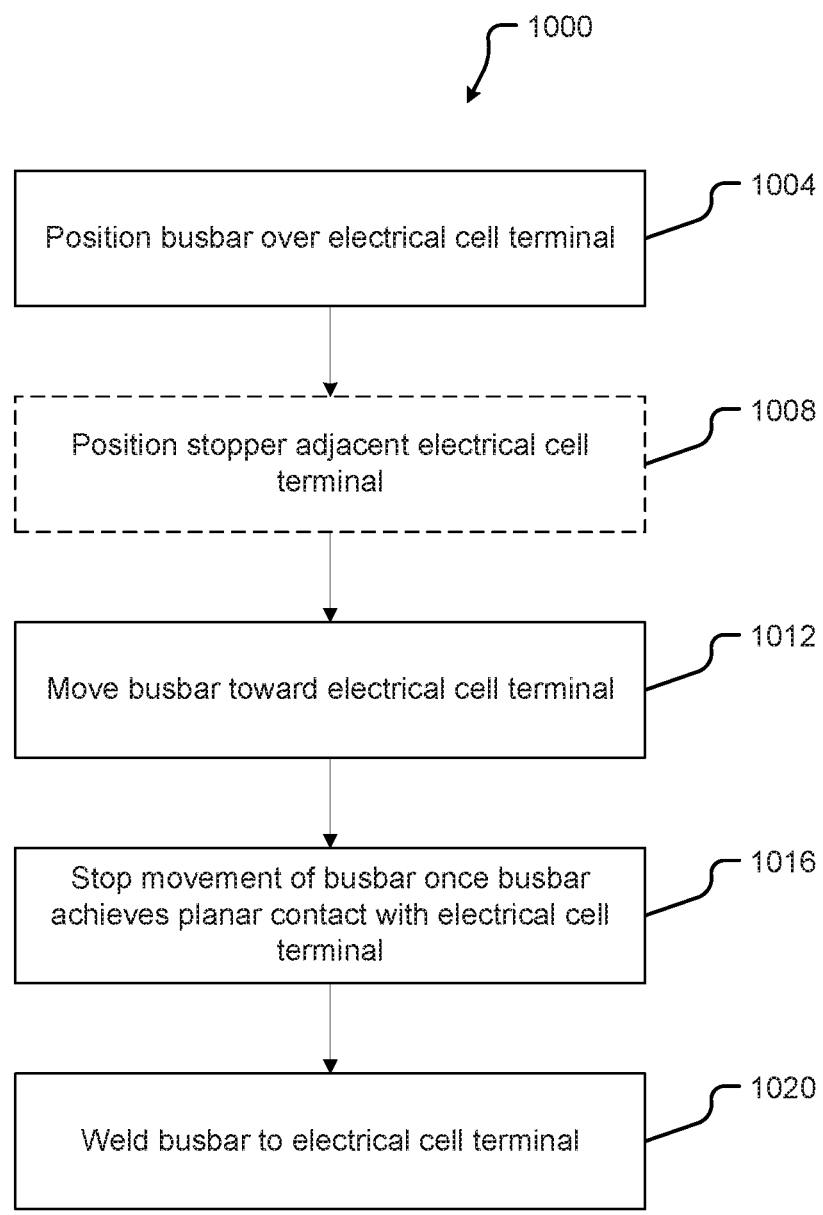
FIG. 10 provides a flowchart according to yet another embodiment of the present disclosure.

With reference to FIG. 10, a method 1000 for welding a busbar to an electrical cell begins with positioning the busbar (which may be, for example, the same as or similar to any of the busbars disclosed herein) at least partially over a terminal of an electrical cell (step 1004). Thus, the busbar may comprise, for example, a first pair of notches separating a first tab from a second tab, and a second pair of notches separating the second tab from a third tab. Additionally, the second tab may be bent relative to the first tab, the third tab may be bent relative to the second tab. Further, the third tab may comprise a first contact surface facing the terminal, and the terminal may comprise a second contact surface facing the third tab. In some embodiments, the third tab of the busbar may be positioned over the electrical cell terminal, such that movement of the busbar and the electrical cell terminal towards each other will cause the first contact surface to contact at least a portion of the second contact surface.

In some embodiments, the method 1000 comprises positioning a stopper adjacent the electrical cell terminal (step 1008). The stopper may be the same as or similar to the stopper 130, and is only needed when the busbar is similar or identical to the busbar 120. The stopper is placed adjacent the electrical cell terminal to ensure that the end of the busbar does not slide past (or at least significantly past) the end of the electrical cell terminal.

The method 1000 also comprises moving the busbar toward the electrical cell terminal (step 1012). This may be accomplished by holding the electrical cell stationary while moving the busbar toward the electrical cell, or by holding the busbar stationary and moving the electrical cell toward the busbar, or by moving both the busbar and the electrical cell toward each other. The movement continues at least until the busbar has contacted the electrical cell (and more particularly, until the first contact surface of the third tab has contacted the second contact surface of the electrical cell terminal), and until the forces resulting from the relative movement of the busbar towards the electrical cell has caused the busbar to deform elastically. The elastic deformation may result, for example, in the third tab being bent into a horizontal position parallel with the first tab (if, for example, the busbar is similar or identical to the busbar 120), or the elastic deformation may result in the vertical distance between the first tab and the third tab being reduced, and the angle between the first tab and the second tab being reduced as well (if, for example, the busbar is similar or identical to the busbar 220).

The method 1000 further comprises stopping the movement of the busbar and the electrical cell toward one another once the third tab is in substantially planar contact with the terminal (step 1016). The elastic deformation of the busbar (as a result of which an angle between the first tab and the second tab may change from step 1004 to step 1016) facilitates the achievement of substantially planar contact between the third tab and the terminal (or more particularly, between the first contact surface of the third tab and the second contact surface of the terminal), because the spring force resulting from the elastic deformation presses the third tab against the terminal. In embodiments where the first contact surface of the third tab comprises two or more dimples, substantially planar contact is achieved when at least two of the two or more dimples are in contact with the second contact surface of the electrical cell terminal.

The method 1000 comprises welding the busbar to the electrical cell terminal (step 1020). The welding may be, for example, spot welding or laser welding. Where laser welding is used and where the busbar comprises at least two dimples on the first contact surface of the third tab, the welding may commence by focusing a laser beam on or near one of the at least two dimples and heating the material of the busbar and the electrical cell terminal to form a melt pool. The weld may then be expanded across the contact area of the third tab and the electrical cell terminal.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the connection of a busbar to an electrical cell. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a busbar for connection to an electrical cell, comprising: a first end; a second end opposite the first end; a top surface extending along a length of the busbar from the first end to the second end; a bottom surface extending along the length of the busbar and opposite the top surface; a first pair of notches disposed on opposite sides of the busbar at a first point along the length of the busbar, the first point closer to the first end than the second end, the first pair of notches separating an extension tab from a connector tab; and a second pair of notches disposed on opposite sides of the busbar at a second point along the length of the busbar, the second point closer to the second end than the first end, the second pair of notches separating the connector tab from a contact tab, wherein the connector tab is oriented at a first angle relative to the extension tab and the contact tab is oriented at a second angle relative to the extension tab.

Aspects of the above busbar include: the connector tab extends underneath a portion of the extension tab, and the contact tab extends underneath the connector tab and the portion of the extension tab; an absolute value of the first angle is greater than an absolute value of the second angle; the second angle is zero degrees and the first angle is different than the second angle; each notch of the first and second pairs of notches is wedge-shaped; the bottom surface comprises a plurality of dimples between the second point and the second end; the busbar is connected to a bus strip at the first end; and the busbar is formed of a single piece of material.

Embodiments also include an electrical assembly comprising: an electrical cell comprising a terminal; and a busbar affixed to the electrical cell, the busbar comprising a first portion extending from a first end of the busbar to a first pair of notches, a second portion extending from the first pair of notches to a second pair of notches, and a third portion extending from the second pair of notches to a second end of the busbar, wherein the third portion is welded to the terminal.

Aspects of the above electrical assembly include: a first cross-sectional area of the busbar between the first pair of notches or the second pair of notches is less than a second cross-sectional area of the busbar between the first pair of notches and the second pair of notches; the first portion is substantially parallel to the third portion; the first portion comprises a substantially planar top surface, and any imaginary line drawn perpendicular to and passing through the substantially planar top surface does not pass through the third portion; the busbar is formed from a single piece of material and comprises a first bend between the first and second portions and a second bend between the second and third portions; and a bus strip in electrical communication with and perpendicular to the first portion.

Embodiments also include a method of welding a busbar to an electrical cell, comprising: positioning a third tab of a busbar at least partially over a terminal of an electrical cell, the busbar comprising a first pair of notches separating a first tab from a second tab, and a second pair of notches separating the second tab from the third tab, wherein the second tab is bent relative to the first tab, the third tab is bent relative to the second tab, the third tab comprises a first contact surface facing the terminal, and the terminal comprises a second contact surface facing the third tab; moving one of the busbar and the electrical cell toward the other of the busbar and the electrical cell at least until the first contact surface contacts the second contact surface and the busbar has deformed elastically; stopping the movement of the one of the busbar and the electrical cell toward the other of the busbar and the electrical cell once the third tab is in substantially planar contact with the terminal; and welding the third tab to the terminal.

Aspects of the above method include: the first contact surface comprises at least two dimples extending from the first contact surface toward the second contact surface; the second tab extends underneath at least a portion of the first tab and the third tab extends underneath the second tab and the portion of the first tab; positioning a stopper at one end of the terminal to prevent the third tab from extending over the one end of the terminal; the welding the third tab to the terminal comprises laser welding the third tab to the terminal; and an angle between the first tab and the second tab at the positioning step is different than an angle between the first tab and the second tab at the welding step.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A busbar for connection to an electrical cell, comprising:
   a first end;
   a second end opposite the first end;
   a top surface extending along a length of the busbar from the first end to the second end;
   a bottom surface extending along the length of the busbar and opposite the top surface;
   a first pair of notches disposed on opposite sides of the busbar at a first point along the length of the busbar, the first point closer to the first end than the second end, the first pair of notches separating an extension tab from a connector tab; and
   a second pair of notches disposed on opposite sides of the busbar at a second point along the length of the busbar, the second point closer to the second end than the first end, the second pair of notches separating the connector tab from a contact tab,
   wherein the connector tab is oriented at a first angle relative to the extension tab and the contact tab is oriented at a second angle relative to the extension tab.

2. The busbar of claim 1, wherein the connector tab extends underneath a portion of the extension tab, and the contact tab extends underneath the connector tab and the portion of the extension tab.

3. The busbar of claim 1, wherein an absolute value of the first angle is greater than an absolute value of the second angle.

4. The busbar of claim 1, wherein the second angle is zero degrees and the first angle is different than the second angle.

5. The busbar of claim 1, wherein each notch of the first and second pairs of notches is wedge-shaped.

6. The busbar of claim 1, wherein the bottom surface comprises a plurality of dimples between the second point and the second end.

7. The busbar of claim 1, wherein the busbar is connected to a bus strip at the first end.

8. The busbar of claim 1, wherein the busbar is formed of a single piece of material.

9. An electrical assembly comprising:
an electrical cell comprising a terminal; and
a busbar affixed to the electrical cell, the busbar comprising a first portion extending from a first end of the busbar to a first pair of notches, a second portion extending from the first pair of notches to a second pair of notches, and a third portion extending from the second pair of notches to a second end of the busbar, wherein the third portion is welded to the terminal.

10. The electrical assembly of claim 9, wherein a first cross-sectional area of the busbar between the first pair of notches or the second pair of notches is less than a second cross-sectional area of the busbar between the first pair of notches and the second pair of notches.

11. The electrical assembly of claim 9, wherein the first portion is substantially parallel to the third portion.

12. The electrical assembly of claim 9, wherein the first portion comprises a substantially planar top surface, and any imaginary line drawn perpendicular to and passing through the substantially planar top surface does not pass through the third portion.

13. The electrical assembly of claim 9, wherein the busbar is formed from a single piece of material and comprises a first bend between the first and second portions and a second bend between the second and third portions.

14. The electrical assembly of claim 9, further comprising a bus strip in electrical communication with and perpendicular to the first portion.

15. A method of welding a busbar to an electrical cell, comprising:
positioning a third tab of a busbar at least partially over a terminal of an electrical cell, the busbar comprising a first pair of notches separating a first tab from a second tab, and a second pair of notches separating the second tab from the third tab, wherein the second tab is bent relative to the first tab, the third tab is bent relative to the second tab, the third tab comprises a first contact surface facing the terminal, and the terminal comprises a second contact surface facing the third tab;
moving one of the busbar and the electrical cell toward the other of the busbar and the electrical cell at least until the first contact surface contacts the second contact surface and the busbar has deformed elastically;
stopping the movement of the one of the busbar and the electrical cell toward the other of the busbar and the electrical cell once the third tab is in substantially planar contact with the terminal; and
welding the third tab to the terminal.

16. The method of claim 15, wherein the first contact surface comprises at least two dimples extending from the first contact surface toward the second contact surface.

17. The method of claim 15, wherein the second tab extends underneath at least a portion of the first tab and the third tab extends underneath the second tab and the portion of the first tab.

18. The method of claim 15, further comprising:
positioning a stopper at one end of the terminal to prevent the third tab from extending over the one end of the terminal.

19. The method of claim 15, wherein the welding the third tab to the terminal comprises laser welding the third tab to the terminal.

20. The method of claim 15, wherein an angle between the first tab and the second tab at the positioning step is different than an angle between the first tab and the second tab at the welding step.

* * * * *